United States Patent [19]
Radtke

[11] Patent Number: 4,869,632
[45] Date of Patent: Sep. 26, 1989

[54] BOLTED CONNECTION FOR A TURBINE DISK

[75] Inventor: Leland J. Radtke, Gatlinburg, Tenn.

[73] Assignee: United Technologies Corporation, Hartford, Conn.

[21] Appl. No.: 163,349

[22] Filed: Mar. 2, 1988

[51] Int. Cl.$^4$ .................. F16B 13/06; F16B 35/02
[52] U.S. Cl. .................. 411/55; 411/339; 411/383; 403/408.1; 416/198 A
[58] Field of Search .................. 411/55, 60, 61, 338, 411/339, 366, 367, 368, 369, 396, 389, 383; 403/408.1; 416/198 A

[56] References Cited

U.S. PATENT DOCUMENTS

| | | | |
|---|---|---|---|
| 1,109,998 | 9/1914 | Loewenstein . | |
| 2,321,170 | 6/1943 | Wallace | 411/60 |
| 2,662,685 | 12/1953 | Blanc | 416/198 A |
| 2,974,558 | 3/1961 | Hodell | 411/339 |
| 3,070,351 | 12/1962 | Hunt, Jr. | 253/77 |
| 3,603,626 | 9/1971 | Whiteside | 411/60 |
| 3,710,674 | 1/1973 | Tabor . | |
| 3,835,615 | 9/1974 | King, Jr. | 403/408.1 |
| 4,496,259 | 1/1985 | Foucher | 411/389 |
| 4,678,383 | 7/1987 | Bergner | 411/55 |
| 4,720,224 | 1/1988 | Peterken | 411/55 |

FOREIGN PATENT DOCUMENTS 739266 6/1980 U.S.S.R. .

Primary Examiner—Neill R. Wilson
Attorney, Agent, or Firm—Edward L. Kochey, Jr.

[57] ABSTRACT

Tie bolt 10 has a reduced shank 34 and a tapered head 50. A split sleeve 38 has a complimentary flare 46 at the head end and surrounds the shank 34. The sleeve accepts shear loading and the tie bolt accepts shock axial loading with low stress concentrations in highly stressed areas.

1 Claim, 1 Drawing Sheet

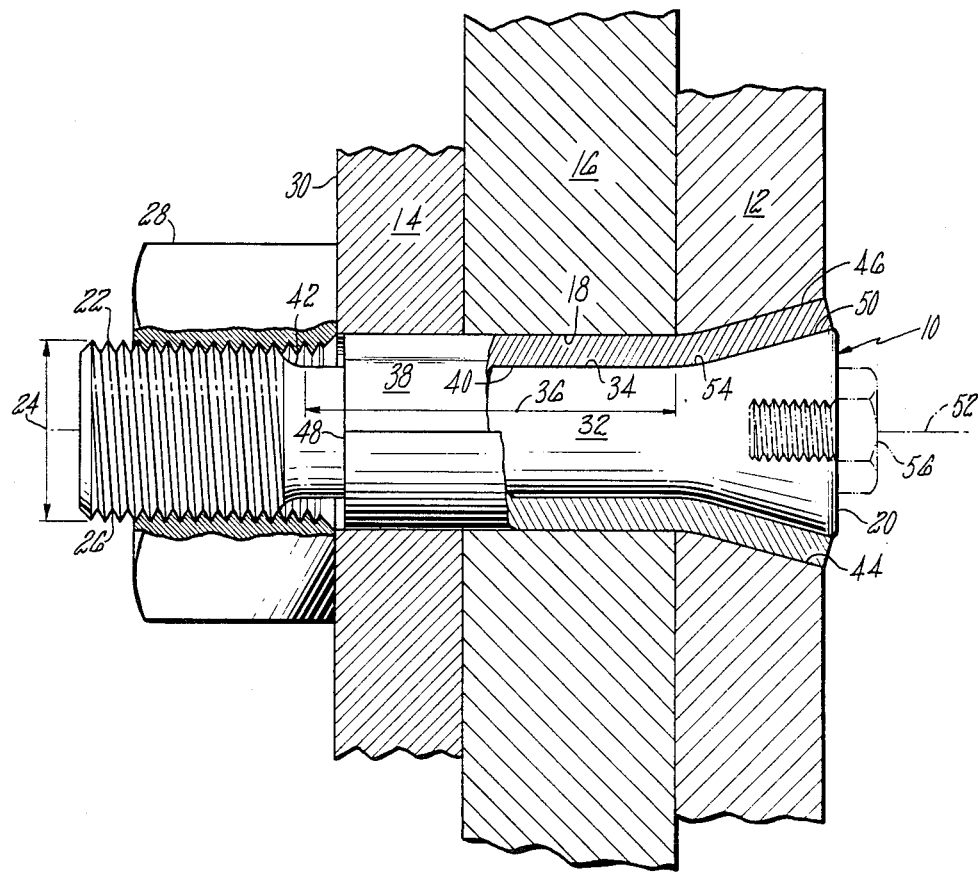

BOLTED CONNECTION FOR A TURBINE DISK

DESCRIPTION

1. Technical Field

The invention relates to bolted connections and in particular to a connection for securing rim spacer flanges to a turbine disk.

2. Background of the Invention

Turbine disks of gas turbine engines must be attached to adjacent disks of the following and preceding turbine stages. This is frequently accomplished by rim spacers having a flange at each end with the flanges being attached to the respective turbine disks. Accordingly, the turbine disk with the flanges secured thereto must tolerate axially loading including shock loads and shear between the flanges and the turbine disk.

Threads of a bolt are notorious for the stress concentration existing at the roots of the threads. It is desirable that the root diameter of these threads be larger than the shank of the bolt to avoid premature failure at the root of the threads. A small shank diameter is desirable since the elasticity of the shank provides stretch for the absorption of shock loads.

Within a turbine disk rotating at high speed any shifting of a tie bolt can lead to unbalance of the assembly. It accordingly is desirable that any bolt be self-centering so that it is incapable of shifting and creating unbalance.

It is also known that the 90 degree angle formed under a conventional head of a bolt results in a high stress concentration. Such stress concentrations are preferably avoided.

SUMMARY OF THE INVENTION

A tie bolt is located within an opening through a turbine disk and the flange is connected thereto. The threads have an outside diameter less than the diameter of the opening so that the bolt may pass therethrough. The central body of the bolt has a lesser diameter than the root of the threads to avoid maximum stress in the thread area where there is a stress concentration because of the root of the threads.

A split sleeve is installed around the central body of the bolt with its outside diameter the same as that of the opening and the inside diameter the same as that of the bolt which it surrounds. Accordingly, all shear loads can be taken by the split sleeve without imposing that loading on the bolt, whereby the bolt must tolerate only axial loading. A nut engages the bolt threads with the split sleeve being sufficiently short to avoid contact with the nut whereby all axial loading is transferred to the bolt itself.

A tapered opening through one of the flanges at the head side of the bolt receives a flared end of the split sleeve, and the head of the bolt is tapered to conform with this flared end. Compressive stresses are placed in the flange which is operating with high tension because of the high speed rotation. This reduces the total stress and stress concentrations at the interface between the head and the shank.

BRIEF DESCRIPTION OF THE DRAWINGS

The FIGURE is a sectional view of the bolt securing two flanges to a turbine disk.

DESCRIPTION OF THE PREFERRED EMBODIMENT

A bolt 10 secures flanges 12 and 14 to a turbine disk 16. Each of these flanges is a portion of a rim spacer wherein a conical member has similar flanges attaching to the next higher and lower turbine stages. These members rotate at high speed during normal gas turbine operation and are subject to high axial and radial loads including shock loads.

An axially aligned opening 18 passes through the disk and the flanges and has a first diameter of 16 mm. The bolt 10 has a head 20 at one end and threads 22 at the other end. These threads have an outside diameter 24 of a second diameter of 15 mm which is less than the diameter of the opening. This is necessary to permit the bolt to pass through the opening during installation.

The threads have a third diameter which is a root diameter of 13 mm. This is the minimum diameter existing in the presence of the high stress concentration at the root of the threads. This should be designed for lower stress than the rest of the bolt since the local nature of this high stress precludes possibility of shock loading absorption, and would lead to local failure.

A nut 28 is threadedly engaged to the bolt, bearing against the surface 30 of flange 14 in a conventional manner.

The bolt has a central body 32 with an outside diameter 34 of 11 mm, this being less than the root diameter 26 of the threaded portion. The bolt has as stretch length 36 of this reduced diameter portion 34 whereby shock loading may be absorbed by stretch of the bolt in this area.

A split sleeve 38 has an outside diameter the same as the inside diameter of opening 18 and fits within the opening. The sleeve is split to permit installation since threads 22 cannot pass therethrough. The inside diameter 40 of the split sleeve is substantially the same as the outside diameter 34 of the shank or intermediate portion 32 of the bolt. Shear loading between flanges 12 or 14 and the disk 16 are thereby absorbed by the sleeve which has no axial loading therein. Only minimal shear loading is transferred to bolt 10.

At the root of the threads of the bolt there is provided a stress reducing groove 42 of a diameter not greater than the root of the threads so as to preclude stress concentrations near the shank.

Flange 12 has a tapered opening 44 with sleeve 38 having a flared portion 46 complimentary with the tapered opening. It can be seen that the sleeve is held in place by this flare with the opposite end 48 being short of surface 30. Accordingly, nut 28 is free of contact with the sleeve and cannot place any loading thereon.

The head 20 of bolt 10 also has a tapered surface 50 of an angle of preferably between 15 and 30 degrees from axis 52. This makes it possible to provide a generous radius 54 at the transition from the head to the transition of the bolt with the slight differential angle being minimum, thereby avoiding stress concentrations at this point.

This angle of interface with the head of the bolt provides a self-locking angle between the bolt, the sleeve and the flange whereby on tightening of nut 28 the bolt will inherently be locked at the other end. Should, however, this angle be selected such that the self-locking feature is not achieved, a small hexagonal head 56 may be located on the bolt.

The tapered head not only reduces the stress concentrations and locks the bolt during tightening but also provides unequivocal centering of the bolt. The bolt cannot shift during operation to upset the balance of the turbine disk.

What is claimed is:

1. A bolted connection for securing interstage flanges to a turbine disk comprising:
   an aligned cylindrical opening through said disk and flanges having a first diameter and having a bolt head side;
   a bolt located within said opening and having a head at one end, threads of an outside second diameter less than said first diameter at the other end, said threads having a root third diameter;
   said bolt having a central body of a fourth diameter less than said root third diameter;
   a split sleeve having an outside diameter equal to said first diameter and an inside diameter equal to said fourth diameter, surrounding said central body and extending past both interfaces between said turbine disk and said flanges;
   a tapered conical opening forming an angle of between 15 and 30 degrees from the axis of said bolt through one of said flanges at the bolt head side;
   said split sleeve having a flared end to conform to said tapered opening;
   the head of said bolt tapered to conform to said flared end; and
   a nut threadedly engaging said bolt threads, and said split sleeve sufficiently shortened to avoid contact with said nut.

* * * * *